(12) United States Patent
Rasheed et al.

(10) Patent No.: US 10,687,022 B2
(45) Date of Patent: Jun. 16, 2020

(54) SYSTEMS AND METHODS FOR AUTOMATED VISUAL SURVEILLANCE

(71) Applicant: AVIGILON FORTRESS CORPORATION, Vancouver (CA)

(72) Inventors: Zeeshan Rasheed, Herndon, VA (US); Dana Eubanks, Herndon, VA (US); Weihong Yin, Great Falls, VA (US); Zhong Zhang, Great Falls, VA (US); Kyle Glowacki, Reston, VA (US); Allison Beach, Leesburg, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 236 days.

(21) Appl. No.: 14/959,831

(22) Filed: Dec. 4, 2015

(65) Prior Publication Data

US 2016/0165187 A1    Jun. 9, 2016

Related U.S. Application Data

(60) Provisional application No. 62/109,841, filed on Jan. 30, 2015, provisional application No. 62/088,446, (Continued)

(51) Int. Cl.
*H04N 7/18* (2006.01)
*G06K 9/00* (2006.01)
(Continued)

(52) U.S. Cl.
CPC ......... *H04N 7/181* (2013.01); *G06K 9/00771* (2013.01); *G06K 9/3241* (2013.01); (Continued)

(58) Field of Classification Search
CPC .... H04N 7/181; H04N 7/188; G06K 9/00771; G06T 17/05; G08B 13/19671
See application file for complete search history.

(56) References Cited

U.S. PATENT DOCUMENTS

| 6,359,647 B1 * | 3/2002 | Sengupta ......... G08B 13/19608 348/154 |
| 6,696,945 B1 | 2/2004 | Venetianer et al. |

(Continued)

OTHER PUBLICATIONS

"Adaptive camera assignment and hand-off algorithm in multiple active camera surveillance system"—Chao-Yang Lee; Shou-Jen Lin; Chen-Wei Lee; Chu-Sing Yang; 2010 International Conference on Machine Learning and Cybernetics (ICMLC), Jul. 11-14, 2010. (Year: 2010).*

(Continued)

*Primary Examiner* — Mainul Hasan
(74) *Attorney, Agent, or Firm* — MH2 Technology Law Group, LLP

(57) ABSTRACT

Embodiments relate to systems, devices, and computer-implemented methods for performing automated visual surveillance by obtaining video camera coordinates determined using video data, video camera metadata, and/or digital elevation models, obtaining a surveillance rule associated with rule coordinates, identifying a video camera that is associated with video camera coordinates that include at least part of the rule coordinates, and transmitting the surveillance rule to a computing device associated with the video camera. The rule coordinates can be automatically determined based on received coordinates of an object. Additionally, the surveillance rule can be generated based on instructions from a user in a natural language syntax.

15 Claims, 9 Drawing Sheets

Related U.S. Application Data filed on Dec. 5, 2014, provisional application No. 62/088,443, filed on Dec. 5, 2014, provisional application No. 62/088,394, filed on Dec. 5, 2014, provisional application No. 62/088,316, filed on Dec. 5, 2014.

(51) Int. Cl.
| | | |
|---|---|---|
| *G08B 13/196* | (2006.01) | |
| *G06T 17/05* | (2011.01) | |
| *G06K 9/62* | (2006.01) | |
| *G06K 9/32* | (2006.01) | |

(52) U.S. Cl.
CPC ............ *G06K 9/6255* (2013.01); *G06T 17/05* (2013.01); *G08B 13/19671* (2013.01); *H04N 7/188* (2013.01); *G06T 2207/30232* (2013.01); *G06T 2219/2004* (2013.01)

(56) References Cited

U.S. PATENT DOCUMENTS

| | | | |
|---|---|---|---|
| 6,970,083 B2 | 11/2005 | Venetianer et al. | |
| 6,999,600 B2 | 2/2006 | Venetianer et al. | |
| 7,319,479 B1* | 1/2008 | Crabtree | G01S 5/16 |
| | | | 348/169 |
| 7,391,907 B1 | 6/2008 | Venetianer et al. | |
| 7,424,175 B2 | 9/2008 | Lipton et al. | |
| 7,801,330 B2 | 9/2010 | Zhang et al. | |
| 7,825,954 B2 | 11/2010 | Zhang et al. | |
| 7,868,912 B2 | 1/2011 | Venetianer et al. | |
| 8,150,103 B2 | 4/2012 | Zhang et al. | |
| 8,334,906 B2 | 12/2012 | Lipton et al. | |
| 8,711,217 B2 | 4/2014 | Venetianer et al. | |
| 8,823,804 B2 | 9/2014 | Haering et al. | |
| 8,948,458 B2 | 2/2015 | Hassan-Shafique et al. | |
| 9,165,190 B2 | 10/2015 | Zhang et al. | |
| 2003/0095687 A1* | 5/2003 | Montgomery | G06K 9/00362 |
| | | | 382/103 |
| 2004/0257444 A1* | 12/2004 | Maruya | G08B 13/19645 |
| | | | 348/169 |
| 2007/0039030 A1* | 2/2007 | Romanowich | H04N 7/17318 |
| | | | 725/105 |
| 2007/0070190 A1 | 3/2007 | Yin et al. | |
| 2007/0182818 A1* | 8/2007 | Buehler | G08B 13/19602 |
| | | | 348/143 |
| 2007/0279214 A1* | 12/2007 | Buehler | G08B 13/19615 |
| | | | 340/521 |
| 2008/0198231 A1* | 8/2008 | Ozdemir | G08B 13/19608 |
| | | | 348/159 |
| 2010/0026802 A1 | 2/2010 | Titus et al. | |
| 2010/0106420 A1 | 4/2010 | Mattikalli et al. | |
| 2010/0157064 A1* | 6/2010 | Cheng | G06K 9/00771 |
| | | | 348/169 |
| 2010/0321473 A1* | 12/2010 | An | H04N 5/2628 |
| | | | 348/47 |
| 2011/0115909 A1 | 5/2011 | Sternberg et al. | |
| 2011/0205355 A1* | 8/2011 | Liu | G06T 7/80 |
| | | | 348/135 |
| 2012/0169882 A1* | 7/2012 | Millar | H04N 7/181 |
| | | | 348/159 |
| 2012/0212611 A1* | 8/2012 | Estes | G08B 13/19641 |
| | | | 348/143 |
| 2013/0329958 A1 | 12/2013 | Oami et al. | |
| 2014/0118543 A1 | 5/2014 | Kerbs et al. | |
| 2014/0211019 A1* | 7/2014 | Choi | H04N 7/181 |
| | | | 348/159 |
| 2015/0088982 A1 | 3/2015 | Johnson et al. | |
| 2016/0165191 A1 | 6/2016 | Rasheed et al. | |
| 2016/0165193 A1 | 6/2016 | Rasheed et al. | |

OTHER PUBLICATIONS

"Fusion of Multiple Trackers in Video Networks"—Yiming Li, Bir Bhanu, 2011 Fifth ACM/IEEE International Conference on Distributed Smart Cameras (ICDSC), Aug. 22-25, 2011. (Year: 2011).*

"Adaptive camera assignment and hand-off algorithm in multiple active camera surveillance system"—Chao-Yang Lee; Shou-Jen Lin; Chen-Wei Lee; Chu-Sing Yang; 2010 International Conference on Machine Learning and Cybernetics (ICMLC), Jul. 11-14, 2010. (Year: 2010).*

"Fusion of Multiple Trackers in Video Networks"—Yiming Li, Bir Bhanu, 2011 Fifth ACM/IEEE International Conference on Distributed Smart Cameras (ICDSC), Aug. 22-25. 2011. (Year: 2011).*

Non-Final Office Action dated Sep. 11, 2017, U.S. Appl. No. 14/959,919, pp. 1-21.

Non-Final Office Action dated Jul. 14, 2017, U.S. Appl. No. 14/959,571, pp. 1-28.

Chao-Yang Lee et al., "Adaptive Camera Assignment and Hand-Off Algorithm in Multiple Active Camera Surveillance System", Proceedings of the Ninth International Conference on Machine Learning and Cybernetics, Jul. 2010, pp. 1-6.

Yiming Li et al., "Fusion of Multiple Trackers in Video Networks", Proceedings of the Fifth ACM/IEEE International Conference on Distributed Smart Cameras, Aug. 2011, pp. 1-6.

* cited by examiner

SYSTEMS AND METHODS FOR AUTOMATED VISUAL SURVEILLANCE

CROSS-REFERENCE TO RELATED APPLICATIONS

This Application claims priority to and the benefit of U.S. Provisional Patent Application No. 62/088,316, titled "USING DIGITAL ELEVATION MODEL DATA TO IDENTIFY AND CLASSIFY TARGETS," filed on 5 Dec. 2014, and U.S. Provisional Patent Application No. 62/088,443, titled "AUTOMATIC RULE CREATION," filed on 5 Dec. 2014, and U.S. Provisional Patent Application No. 62/088,446, titled "RULES BASED ON MAP DATA," filed on 5 Dec. 2014, and U.S. Provisional Patent Application No. 62/088,394, titled "TIME-OF-APPROACH RULE," filed on 5 Dec. 2014, and U.S. Provisional Patent Application No. 62/109,841, titled "DEM DATA BOUNDARY HANDLING," filed on 30 Jan. 2015, the contents of which are hereby incorporated herein by reference in their entirety. This application is related to U.S. patent application Ser. No. 14/959,919, entitled "SYSTEMS AND METHODS FOR VIDEO ANALYSIS RULES BASED ON MAP DATA" filed on Dec. 4, 2015, and U.S. patent application Ser. No. 14/959,571, entitled "TIME-OF-APPROACH RULE" filed on Dec. 4, 2015, the contents of which are hereby incorporated herein by reference in their entirety.

STATEMENT RE: FEDERALLY SPONSORED RESEARCH OR DEVELOPMENT

This invention was made with government support under Contract No. M67854-12-C-6548 awarded by the Office of Naval Research. The government has or may have certain rights in the invention.

BACKGROUND

Computer vision systems can be used for automated visual surveillance by setting up a video camera to stream a video feed, associating surveillance rules with positions within the video feed, and determining that objects within the video feed violate the rules. For example, a rule can be to notify a user if an object enters into a selected area within the video feed.

However, such a system has numerous shortcomings. For example, the camera must remain static because if the camera is moved, a previously selected area within the video feed will no longer be associated with the same physical area being monitored. Additionally, rules are associated with a specific camera feed, and cannot be applied to views from other video cameras. Further, rules and areas associated with the rules have to be manually entered, which can require significant manual effort and is prone to human error.

Accordingly, there is a desire for methods, systems, and computer readable media for improved automated visual surveillance in computer vision systems.

SUMMARY

The present disclosure relates to systems, devices, and methods for improved automated visual surveillance.

Implementations of the present teachings relate to methods, systems, and computer-readable storage media for performing automated visual surveillance by obtaining video camera coordinates determined using video data, video camera metadata, and/or digital elevation models, obtaining a surveillance rule associated with rule coordinates, identifying a video camera that is associated with video camera coordinates that include at least part of the rule coordinates, and transmitting the surveillance rule to a computing device associated with the video camera.

In at least one embodiment, the rule coordinates can be automatically determined based on received coordinates of an object.

In at least one embodiment, the surveillance rule can be generated based on instructions from a user in a natural language syntax.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
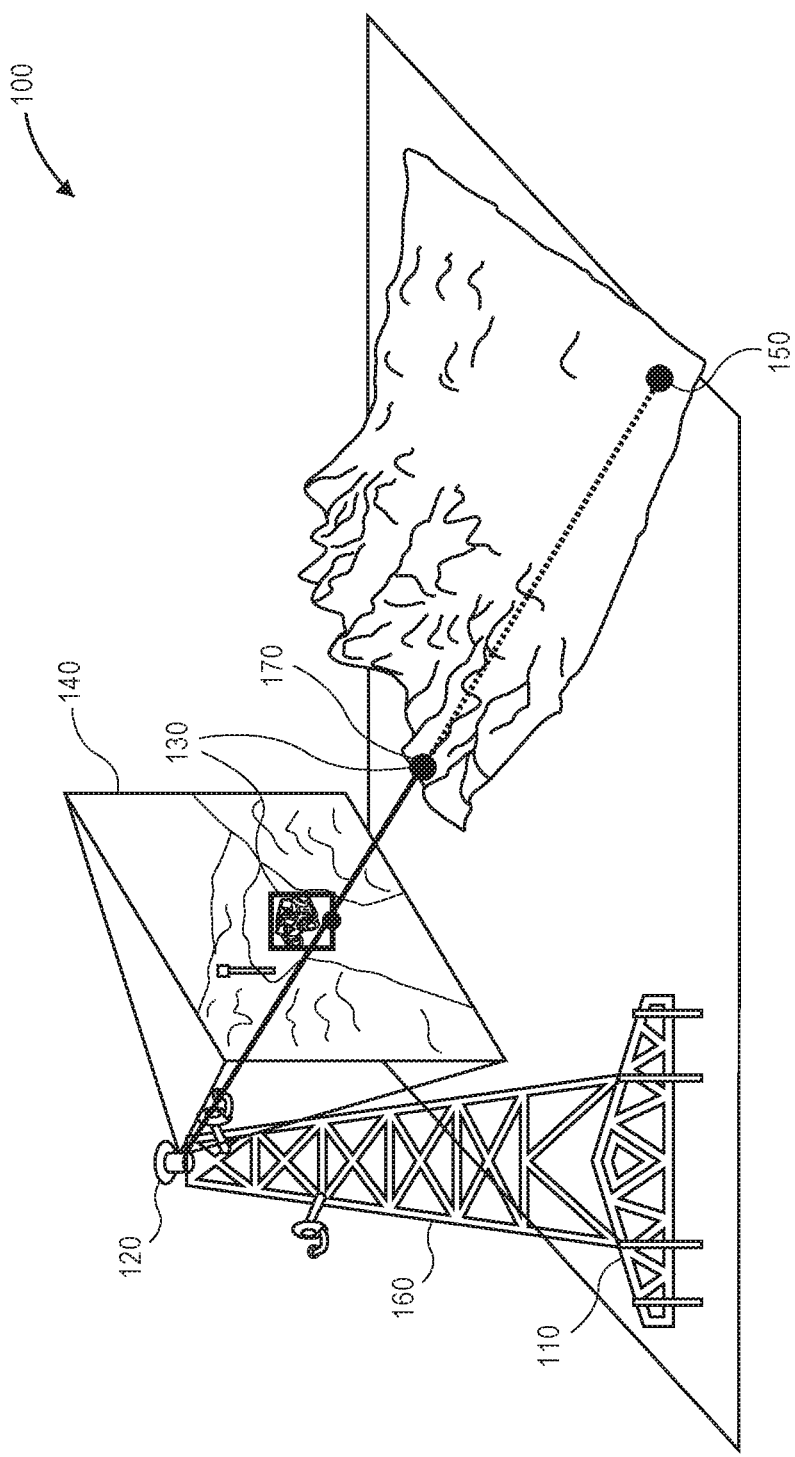
FIG. 1 is a diagram depicting an example of an automated visual surveillance environment, consistent with certain disclosed embodiments.

The following detailed description refers to the accompanying drawings. Wherever convenient, the same reference numbers are used in the drawings and the following description refers to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an example of an automated visual surveillance environment, consistent with certain disclosed embodiments. In particular, FIG. 1 depicts an automated visual surveillance environment 100 that includes a computing device 110, a video camera 120, and a monitored object 130.

In some embodiments, computing device 110 can each represent any type of one or more computing devices that can send instructions to video camera 120, receive video data and metadata from video camera 120, determine coordinates of a field-of-view (FOV) of video camera 120 (e.g., FOV 140), receive surveillance rules (hereinafter "rules") from a centralized information system (CIS) (not pictured) associated with coordinates, determine physical locations of objects (e.g., monitored object 130) within the FOV of video camera 120, determine whether rules are broken, generate alerts based on broken rules, and stream monitored object information, as described in further detail below. In various embodiments, computing device 110 can be, for example, a server, a mainframe, a proprietary and/or custom built device, etc.

In some implementations, computing device 110 can obtain and utilize digital elevation model (DEM) data to determine more precise physical locations of objects, as described in further detail below.

In some embodiments, video camera 120 can represent any type of one or more video cameras that can receive instructions from computing device 110 and send video data and metadata to computing device 110. In various embodiments, video camera 120 can be a capable of capturing video data in one or more spectrums, including, visible, infrared, ultraviolet, etc. Additionally, in further embodiments, video camera 120 can include pan-tilt-zoom (PTZ) functionality, rangefinder functionality, etc.

In some embodiments, video camera 120 can include or be connected to a sensor device. The sensor device can include one or more sensors, such as a Global Positioning System (GPS) sensor or an inertial measurement unit (IMU) sensor. In other embodiments, video camera 120 can include laser emitters and/or detectors, radar capability, etc. In various embodiments, information collected using the one or more sensors, emitters, detectors, and the like, can be stored, sent, and/or streamed as metadata. For example the metadata can be streamed to computing device 110.

In some implementations, video camera 120 can include functionality for detecting its location (e.g., using a GPS sensor), as well as geometric information regarding its current FOV (e.g., using an IMU sensor). FOV 140 can represent a current FOV of video camera 120. In various embodiments, video data captured in the current FOV of video camera 120 can be stored, sent, and/or streamed. For example the video data can be streamed to computing device 110.

In some embodiments, video camera 120 can detect its view angle (e.g., 15 degrees from horizontal), its height off the ground (i.e., altitude), an azimuth angle, and the bounds of its FOV using an IMU sensor. In some embodiments, the bounds of the FOV of video camera 120 can be expressed as the coordinates of the center of the FOV and vertical and horizontal angles to the edges of the FOV. In other embodiments, the bounds of the FOV of video camera 120 can be determined based on the focal length of the FOV and the center of the FOV.

In various embodiments, the location and geometric information regarding the FOV of video camera 120 (e.g., view angle, altitude, FOV bounds, etc.) can be stored as metadata and/or sent or streamed as metadata to computing device 110.

In some embodiments, computing device 110 and video camera 120 can be part of the same structure and connected via one or more wired and/or wireless connections. For example, as depicted in FIG. 1, computing device 110 and video camera 120 can be connected to tower 160. In some implementations, tower 160 can be a trailer-mounted tower with mounted surveillance systems, such as a Ground-Based Operational Surveillance System (G-BOSS) tower.

In other embodiments, computing device 110 and video camera 120 can be parts of a single device, while, in further embodiments, computing device 110 and video camera 120 can be remote to one another.

As shown in FIG. 1, video camera 120 has FOV 140 that includes monitored object 130 (a vehicle). Based on data received from video camera 120, including video data and metadata that includes the location of video camera 120 and geometric information of video camera 120, a computing device (e.g., computing device 110 or a centralized information system, described in further detail below) could determine, based on a flat-earth model target geolocation, that monitored object 130 is at location 150. Based on the geolocation, the computing device could also determine that monitored object 130 is of a relatively large size, potentially too large to be a vehicle.

However, as shown in FIG. 1, monitored object 130 is a vehicle and is not at location 150, but is actually at location 170, and, by using a flat-earth model target geolocation, the computing device is unable to account for the raised elevation of location 170.

Alternatively, the computing device can utilize DEM data with the video data and the metadata, as discussed in further detail below, to account for the raised elevated of location 170 and determine that the physical location of monitored object 130 is location 170. Additionally, the computing device can determine that size of monitored object 130 is within a size range of a vehicle. Therefore, using DEM data, the computing device is able to, for example, determine physical locations of objects with a higher degree of accuracy, determine object sizes with a higher degree of accuracy, and determine object types with a greater degree of accuracy.

The diagram depicted in FIG. 1 is merely for the purpose of illustration and is not intended to be limiting. Further, the automated visual surveillance environment depicted is merely a simplified example of an automated visual surveillance environment, consistent with certain disclosed embodiments, but this example is not intended to be limiting and many variations are possible. For example, in various embodiments, the automated visual surveillance environment can include additional video cameras, computing devices, etc.

Figure 2:
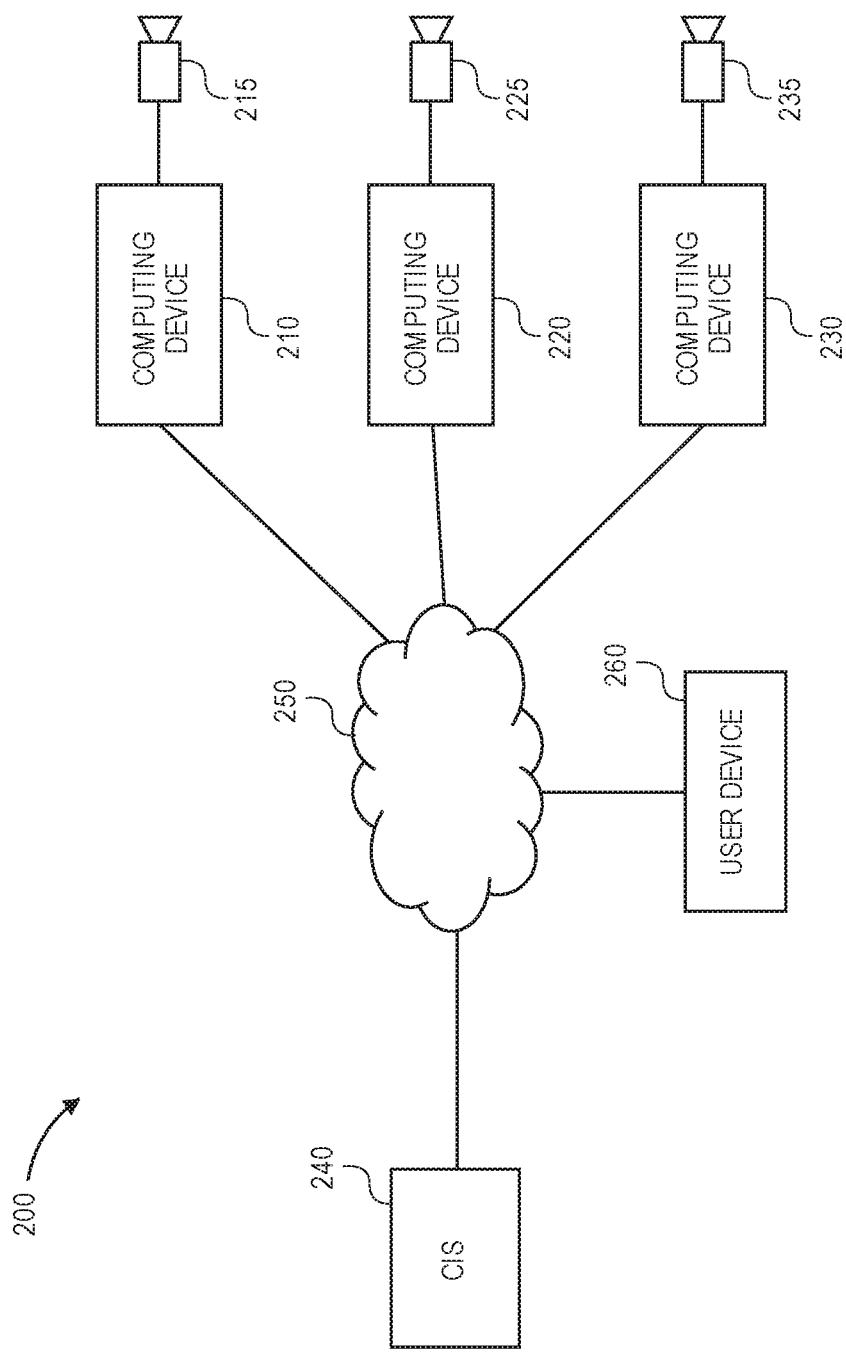
FIG. 2 is a diagram depicting an example of a distributed automated visual surveillance system, consistent with certain disclosed embodiments.

FIG. 2 is a diagram depicting an example of a distributed automated visual surveillance system, consistent with certain disclosed embodiments. In particular, FIG. 2 depicts a distributed automated visual surveillance system 200 that includes a computing device 210, a computing device 220, a computing device 230, a centralized information system 240, and a network 250.

In some embodiments, computing device 210, computing device 220, and/or computing device 230 can each represent any type of one or more devices that can send instructions to video camera 215, video camera 225, and video camera 235, respectively, receive video data and metadata from video cameras 215-235, determine coordinates of the FOVs of video cameras 215-235, send coordinates of the FOVs of video cameras 215-235 to CIS 240, send and/or stream video data and/or metadata to CIS 240, receive rules from CIS 240 corresponding to determined coordinates of FOVs, determine physical locations of objects (e.g., monitored object 130 in FIG. 1) within the FOVs of video cameras 215-235, determine whether rules are broken, generate alerts based on broken rules, and stream monitored object data, as described in further detail below. For example, computing device 210, computing device 220, or computing device 230 can represent computing device 110 in FIG. 1 and video camera 215, video camera 225, or video camera 235 can represent video camera 120 in FIG. 1.

In some implementations, CIS 240 can represent any type of one or more computing devices that can, for example, communicate with other devices via network 250, store rules, receive coordinates from one or more computing devices (e.g., computing devices 210-230), receive video data and/or metadata from one or more computing devices (e.g., computing devices 210-230), determine coordinates of the FOVs of one or more video cameras (e.g. video cameras 215-235), send rules corresponding to received coordinates to one or more computing devices, send instructions to change the FOV of one or more computing devices, etc. In various embodiments, CIS 240 can represent one or more computing devices such as, for example, a server, a mainframe computer, a laptop computer, and/or a desktop computer.

In some implementations, user device 260 can represent any type of one or more computing devices that can, for example, automatically generate one or more rules, receive instructions to generate one or more rules, notify users in response to received alerts from one or more computing devices (e.g., computing device 210-230), provide streamed monitored object information received from one or more computing devices, etc. In various embodiments, user device 260 can represent one or more computing devices such as, for example, a server, a mainframe computer, a laptop computer, and/or a desktop computer.

In some embodiments, network 250 can represent any type of one or more wide area communications networks. For example, network 250 can include the Internet and/or one or more mobile networks.

The diagram depicted in FIG. 2 is merely for the purpose of illustration and is not intended to be limiting. Further, the distributed automated visual surveillance system depicted is merely a simplified example of a distributed automated visual surveillance system, consistent with certain disclosed embodiments, but this example is not intended to be limiting and many variations are possible. For example, in various embodiments, the distributed automated visual surveillance system can include additional computing devices, CISs, user devices, and/or other devices. As an additional example, in some embodiments, user device 260 and CIS 240 can be connected via one or more networks (as shown in FIG. 2), can directly connected, can be connected via a local area network, or can represent a single device.

Figure 3:
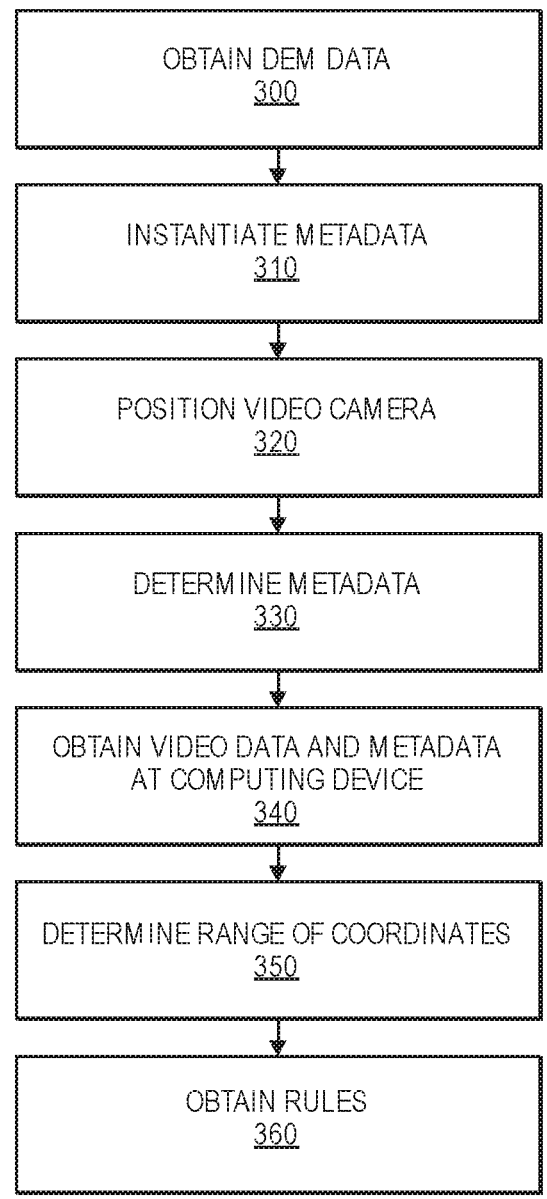
FIG. 3 is a flow diagram illustrating an example of a process of providing automated visual surveillance using DEM data, consistent with certain disclosed embodiments.

FIG. 3 is a flow diagram illustrating an example of a process of providing automated visual surveillance using DEM data, consistent with certain disclosed embodiments. In various embodiments, the process can be performed using a computerized device or devices and a video camera or video cameras. For example, the process can be performed by computing device 110 and video camera 120 in FIG. 1 or computing device 210, video camera 215, computing device 220, video camera 225, computing device 230, video camera 235, and/or CIS 240 in FIG. 2. For simplicity of description, the process of FIG. 3 will refer to a video camera (singular) and a computing device (singular). However, in various embodiments, the process described can be performed with multiple video cameras and/or multiple computing devices.

The process can begin in 300, when the computing device obtains DEM data. In some embodiments, the DEM data can be specific to the location of the video camera and/or the computing device. In other embodiments, the DEM data may cover some or all possible locations within possible FOVs of the video camera.

In some implementations, the DEM data can be obtained, directly or indirectly (e.g., via a CIS), from the United States Geological Survey (USGS) and/or the National Oceanic and Atmospheric Administration (NOAA). For example, the National Geophysical Data Center (NGDC), which is part of the NOAA, provides a geospatial online catalog that links to web-published DEMs.

In some embodiments, a DEM can be a digital model or 3D representation of the earth's surface, including objects, geological formations, etc. on the earth's surface, which can be used to define the elevation of a specific point on a map. DEM data may be bathymetric, topographic, or a merged combination of both. DEM data can also range from high-resolution coastal DEM data for local studies to coarser DEM data with global coverage.

In various embodiments, DEM data can be represented as a raster or a heightmap (e.g., a grid of squares) or as a vector-based triangular irregular network (TIN). DEM data is commonly built using data collected using remote sensing techniques and/or land surveying.

In 310, the video camera and/or the computing device can initialize metadata for the video camera. For example, the video camera can be pointed due north with an FOV that is parallel to the horizontal by an operator, and the metadata can be initialized as due north with an FOV that is parallel to the horizontal. Accordingly, any movement by the camera (e.g., by panning, tilting, or zooming) can result in an appropriate change in the metadata. For example, if the camera pans 45 degrees to the left of due north, the metadata can indicate that the camera is pointing due west. As an additional example, if the camera tilts 10 degrees down, the metadata can indicate that the camera is −10 degrees from horizontal.

In 320, the video camera can be positioned to cover a selected FOV. For example, the computing device can send instructions to the video camera to pan, tilt, or zoom based on operator instructions, based on a monitoring schedule that changes the position of the camera at selected times, based on instructions or a rule received from a CIS, based on instructions or a rule received from a user device, etc.

In 330, the video camera can determine, send, and/or stream the metadata associated with the selected FOV. For example, the camera can determine (e.g., based on movement from the initialization position) the cardinal direction (e.g., north, northwest, 15 degrees east of north, etc.) and the vertical direction (e.g. −10 degrees from horizontal, 23 degrees from horizontal, etc.). Additionally, for example, the camera can determine the bounds of the selected FOV. In some embodiments, the bounds of the FOV can be expressed as the coordinates of the center of the FOV and vertical and horizontal angles to the edges of the FOV. In other embodiments, the bounds of the FOV can be determined based on the focal length of the FOV (e.g., based on the current zoom level) and the center of the FOV.

In some embodiments, the metadata can also include a height off the ground (i.e., altitude) of the video camera, which can be manually entered if the height of the video camera is static, or initialized in 310 if the video camera is capable of moving up and down.

In 340, the computing device can obtain video data (e.g., captured in the selected FOV) and metadata from the video camera. For example, if the computing device is connected to the video camera, the computing device can receive the video data and metadata via a direct connection to the video camera. In other embodiments, if the computing device is or includes a CIS (e.g., CIS 240 in FIG. 2), the computing device can receive the video data and metadata via a computing device connected to the video camera.

In 350, the computing device can determine a range of real-world coordinates in the FOV using the video data. In some implementations, latitude and longitude or Universal Transverse Mercator (UTM) coordinates can be determined for the location in the center of the FOV and/or for the bounds of the FOV using the video data and the metadata. For example, using the known coordinates of the camera (e.g., from a GPS sensor or manually entered by an operator), the camera coordinates can be converted into real-world coordinates by projecting the two-dimensional FOV onto the three-dimensional real-world (e.g., using projective geometry, projection transformation matrices, and/or model target geolocation processes).

However, without considering DEM data, the resulting coordinates would be based on a flat-earth model target geolocation. Accordingly, if objects or geological formations are within the FOV, the determined coordinates may not be accurate (e.g., as shown with monitored object 130 in FIG. 1).

The DEM data can indicate the surface elevation at different latitude and longitude or UTM coordinates. Accordingly, the computing device can account for differences in surface elevation when determining the coordinates. For example, if there is an area of raised elevation at the center of the FOV, the computing device can determine that the coordinates of the center of the FOV is actually closer to the video camera than a flat-earth model target geolocation would indicate. Thus, the computing device can factor in the DEM data when projecting the two-dimensional FOV onto the three-dimensional real-world.

In some embodiments, elevation data can be assigned to pixels in the FOV based on the DEM data, even when the FOV covers different blocks of DEM data. The DEM data is usually stored and available in blocks. Although the location of a video camera is in one block, its FOV may have overlaps with multiple DEM blocks. Instead of using multiple blocks of DEM data simultaneously which may encounter boundary issues, some embodiments build an image to geographic location look up table first for each FOV. This look up table can be computed using the metadata such as the video camera's physical location, heading, focal length and field-of-view angles, as well as the blocks of DEM data around the camera location. For each pixel in the FOV, the look up table provides its corresponding real-world geographic location. With a given video camera monitoring position accuracy requirement, for example, three feet, both image and physical video camera effective monitoring areas can also be computed. The physical effective monitoring range further tells which blocks of DEM data are actually used by the computing device. With the use of this image pixel to geographic location look up table, a downstream system does not need to access the DEM data directly; hence there is no DEM block boundary issue anymore.

In some embodiments, the computing device can determine the range of coordinates within the FOV based on the bounds of the FOV, while, in further embodiments, the computing device can determine the range of the coordinates within the FOV by determining coordinates for all or some of the pixels within the FOV.

In some embodiments, if the computing device is not or does not include a CIS, the computing device can send the range of coordinates to a CIS (e.g., CIS 240 in FIG. 2).

In 360, the computing device can obtain rule(s) associated with the range of coordinates. In some embodiments, if the computing device is or includes a CIS, the computing device can search stored rules based on the coordinates and determine rules, if any, that correspond to the coordinates. If any rules are determined, the computing device can send the rules to a computing device associated with the video camera.

Alternatively, in other embodiments, if the computing device is not or does not include a CIS, the computing device can receive the rules from a CIS in response to sending the range of coordinates to the CIS. Then, the computing device can monitor areas of the FOV that correspond to the obtained rule(s) and determine when and/or if any rules are broken, as discuss in further detail below.

While the functions or operations depicted in FIG. 3 are shown as being performed in a particular order, the order described is merely an example, and various different sequences of operations can be performed, consistent with certain disclosed embodiments. For example, obtaining the DEM data in 300 can be performed after initializing the metadata in 310, after positioning the video camera in 330, after determining the metadata in 330, or after obtaining the video data and the metadata in 340.

Figure 4:
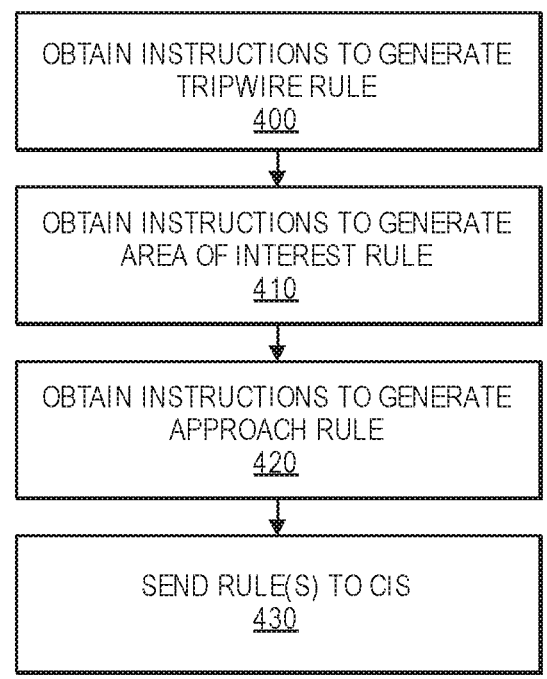
FIG. 4 is a flow diagram illustrating an example of a process of receiving instructions to generate rules, consistent with certain disclosed embodiments.

FIG. 4 is a flow diagram illustrating an example of a process of receiving instructions to generate rules, consistent with certain disclosed embodiments. In various embodiments, the process can be performed using a computerized device or devices. For example, the process can be performed by user device 260 or CIS 240 in FIG. 2. For simplicity of description, the process of FIG. 4 will refer to a computing device (singular). However, in various embodiments, the process described can be performed with multiple computing devices.

The process can begin in 400, when the computing device obtains instructions to generate a video tripwire rule. In some embodiments, the instructions can include input from a user on a map that indicates a position of a video tripwire and/or input on a streaming video or a static image of an FOV of a video camera that indicates a position of the video tripwire. In further embodiments, the instructions can include a map object, coordinates of an object, and/or instructions to generate the video tripwire rule in a natural language based syntax, as discussed in further detail below.

In some implementations, real-world coordinates of the video tripwire can be determined based on the input (e.g., the latitude and longitude or the UTM coordinates). For example, a map can have coordinates associated with each position, and the coordinates can be determined based on the selected positions of the map corresponding to the tripwire. As another example, an FOV can have coordinates associated with each pixel (e.g., as determined in 350 of FIG. 3), and the coordinates can be determined based on the pixels corresponding to selected positions of the tripwire.

Additionally, in some embodiments, the instructions can include specific parameters for the tripwire rule. For example, a parameter can be that the rule can only be broken by a certain type of object, by an object traveling within a certain range of speeds, by an object within a certain size range, by an object with a heading in a certain direction, by an object crossing the tripwire within a certain time range, etc.

Additional details regarding video tripwires are discussed in further detail in U.S. Pat. No. 6,696,945, granted 24 Feb. 2004, entitled Video Tripwire, and U.S. Pat. No. 6,970,083, granted 29 Nov. 2005, entitled Video Tripwire, which are hereby incorporated by reference in their entirety.

In 410, the computing device can obtain instructions to generate an area of interest rule. In some embodiments, the instructions can include input from a user on a map that indicates a position of an area of interest and/or input on a streaming video or a static image of an FOV of a video camera that indicates a position of the area of interest. In further embodiments, the instructions can include a map object, coordinates of an object, and/or instructions to generate the area of interest rule in a natural language based syntax, as discussed in further detail below.

In some implementations, real-world coordinates of the area of interest can be determined based on the input (e.g., the latitude and longitude or the UTM coordinates). For example, a map can have coordinates associated with each position, and the coordinates can be determined based on the selected positions of the map of the area of interest. As another example, an FOV can have coordinates associated with each pixel (e.g., as determined in 350 of FIG. 3), and the coordinates can be determined based on the pixels corresponding to the area of interest.

Additionally, in some embodiments, the instructions can include specific parameters for the area of interest rule. For example, a parameter can be that the rule can only be broken by a certain type of object, by an object traveling within a certain range of speeds, by an object within a certain size range, by an object with a heading in a certain direction, by an object being in the area of interest within a certain time range, by an object remaining in the area of interest and/or remaining static in the area of interest for a certain amount of time (i.e., loitering), by an object entering the area of interest, by an object leaving the area of interest, by an object appearing in the area of interest, by an object disappearing from the area of interest, by a first object leaving behind a second object in the area of interest, etc.

In 420, the computing device can obtain instructions to generate an approach rule. In some embodiments, the instructions can include input from a user of a selected video camera and a distance from the video camera for the approach rule. In further embodiments, the instructions can include a map object, coordinates of an object, and/or instructions to generate the approach rule in a natural language based syntax, as discussed in further detail below.

In some implementations, real-world coordinates of the approach rule can be determined based on the input (e.g., the latitude and longitude or the UTM coordinates). For example, the selected video camera or object can have coordinates associated with it, the real-world coordinates of the approach rule can be determined based on the coordinates of the video camera and the distance from the video camera for the approach rule. In further embodiments, the instructions can include coordinates of an object and/or instructions to generate the approach rule relative to the object in a natural language based syntax, as discussed in further detail below.

Additionally, in some embodiments, the instructions can include specific parameters for the approach rule. For example, a parameter can be that the rule can only be broken by a certain type of object, by an object traveling within a certain range of speeds, by an object within a certain size range, by an object with a heading towards or away from the video camera or object, by an object approaching the video camera or object within a certain time range, etc.

In some implementations, the instructions can instruct the computing device to determine an estimated time of arrival of an object that is within a certain distance of the video camera or object. For example, the speed, heading, and position of the object can be determined and used to determine the estimated time of arrival.

In 430, one or more of a tripwire rule, an area of interest rule, or an approach rule can be sent to the CIS (e.g., CIS 240 in FIG. 2), and the CIS can store the rules. In embodiments where the CIS performs one or more of 400-420, the CIS can store the rules in 430.

In some embodiments, the CIS or the user device can identify whether any video cameras connected to the CIS or the user device have the ability to monitor an area corresponding to the determined coordinates of a tripwire rule, an area of interest rule, and/or an approach rule. For example, each video camera can be associated with its physical location and/or the coordinates of possible FOVs of the video camera. Accordingly, the coordinates of the rule can be used to search the coordinates of the video cameras and/or the coordinates of possible FOVs of the video cameras. In further embodiments, if the rule and/or coordinates associated with the rule are identified as high-priority and the coordinates remain out of view of video cameras connected to the CIS or the user device, the CIS or the user device can send the rule and instructions to a computing device associated with a video camera that is identified to have a possible FOV that matches the coordinates associated with the rule. The instructions can be for the video camera to adjust its FOV to cover the coordinates of the rule.

While the functions or operations depicted in FIG. 4 are shown as being performed in a particular order, the order described is merely an example, and various different sequences of operations can be performed, consistent with certain disclosed embodiments. For example, only one of 400, 410, or 420 may need to be performed prior to sending and/or storing the rule(s) in 430. Accordingly, in some embodiments, instructions can be received to generate a tripwire rule, an area of interest rule, or an approach rule, and the rule can be sent to the CIS and/or stored after it is generated and before any other rules are generated.

Figure 5:
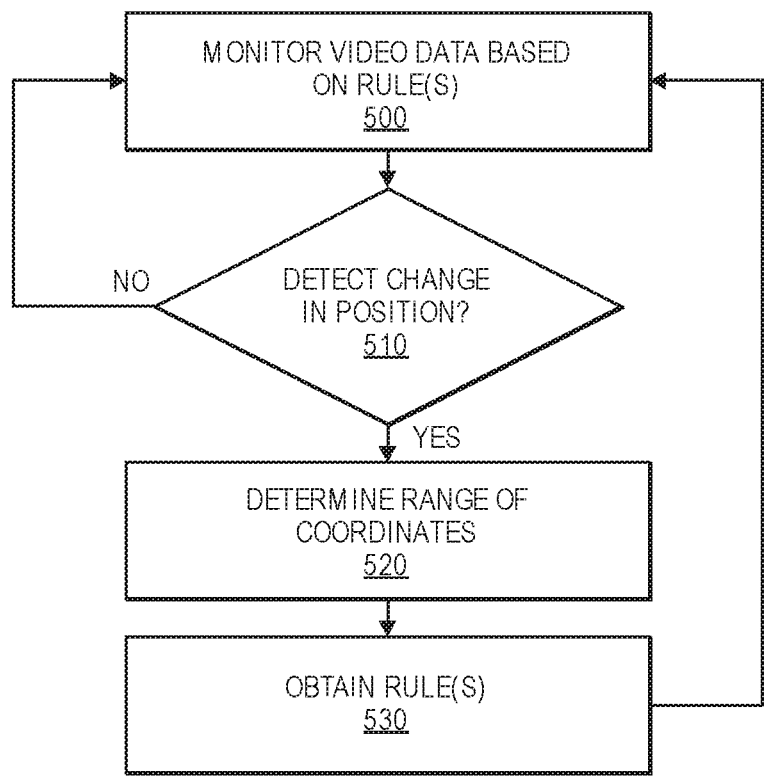
FIG. 5 is a flow diagram illustrating an example of a process of providing automated visual surveillance using DEM data, consistent with certain disclosed embodiments.

FIG. 5 is a flow diagram illustrating an example of a process of providing automated visual surveillance using DEM data, consistent with certain disclosed embodiments. In various embodiments, the process can be performed using a computerized device or devices and a video camera or video cameras. For example, the process can be performed by computing device 110 and video camera 120 in FIG. 1 or computing device 210, video camera 215, computing device 220, video camera 225, computing device 230, video camera 235, and/or CIS 240 in FIG. 2. For simplicity of description, the process of FIG. 5 will refer to a video camera (singular) and a computing device (singular). However, in various embodiments, the process described can be used with multiple video cameras and/or multiple computing devices.

In some embodiments, the process can begin after DEM data is obtained (e.g., 300 in FIG. 3), metadata is initialized (e.g., 310 in FIG. 3), and the video camera is positioned (e.g., 320). In 500, the computing device can obtain and monitor the video data and metadata received from the video camera based on rule(s) received from the CIS (e.g., 370 in FIG. 3). For example, the computing device can determine when and/or if any rules are broken and/or stream target information. Monitoring video data and metadata is discussed in further detail below.

In 510, the computing device can detect whether a change in the position of the video camera has occurred based on the video data or the metadata from the video camera. For example, if the video camera pans, tilts, or zooms, the metadata received from the video camera can indicate that the bounds of the FOV have changed, that the cardinal direction has changed, that the vertical direction has changed, that the altitude of the camera has changed, etc.

If no change is detected (NO in 510) (i.e., the video camera remains stationary) the processes can remain in 500, and the computing device can monitor video data and metadata.

If a change is detected (YES in 510) then, in 520, the computing device can determine a range of real-world coordinates in the new FOV using the video data, the metadata, and, in some embodiments, the DEM data, as described above in 350 of FIG. 3.

In some embodiments, if the computing device is not or does not include a CIS, the computing device can send the range of coordinates to a CIS (e.g., CIS 240 in FIG. 2).

In 530, the computing device can obtain rule(s) associated with the range of coordinates. For example, if the computing device is or includes a CIS, the computing device can search stored rules based on the new range of coordinates and determine rule, if any, that correspond to the coordinates. If any rules are determined, the computing device can send the rules to a computing device associated with the video camera.

Alternatively, in other embodiments, if the computing device is not or does not include a CIS, the computing device can receive the rule(s) from a CIS after the CIS obtains the new range of coordinates and determines which rules, if any, correspond to the range of coordinates.

The process can then return to 500, and the computing device can monitor video data and metadata to determine if any of the newly obtained rule(s) are broken, as discussed in further detail below.

While the functions or operations depicted in FIG. 5 are shown as being performed in a particular order, the order described is merely an example, and various different sequences of operations can be performed, consistent with certain disclosed embodiments.

Figure 6:
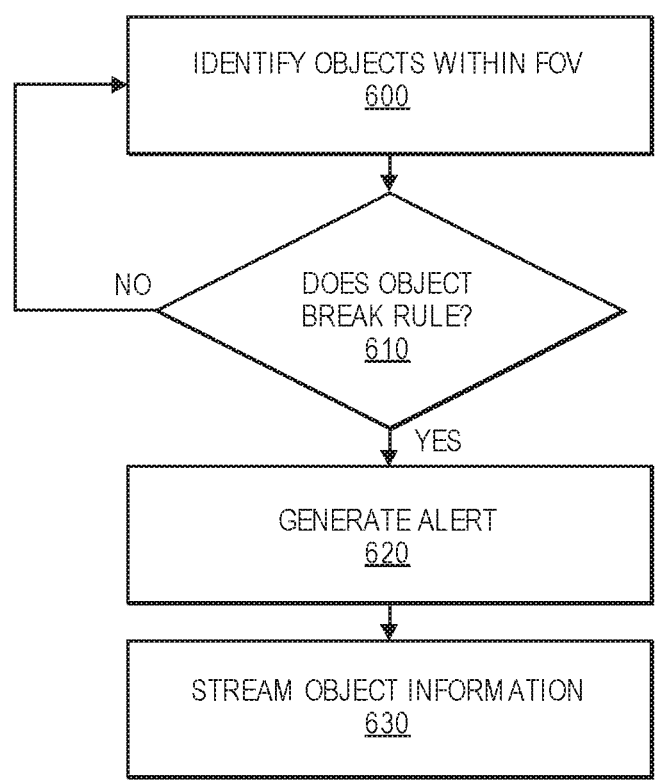
FIG. 6 is a flow diagram illustrating an example of a process of monitoring video data and/or metadata, consistent with certain disclosed embodiments.

FIG. 6 is a flow diagram illustrating an example of a process of monitoring video data and/or metadata, consistent with certain disclosed embodiments. In various embodiments, the process can be performed using a computerized device or devices and a video camera or video cameras. For example, the process can be performed by computing device 110 and video camera 120 in FIG. 1 or computing device 210, video camera 215, computing device 220, video camera 225, computing device 230, and/or video camera 235 in FIG. 2. For simplicity of description, the process of FIG. 6 will refer to a video camera (singular) and a computing device (singular). However, in various embodiments, the process described can be used with multiple video cameras and/or multiple computing devices.

In further embodiments, the process described in FIG. 6 can represent the process performed by the computing device in 500 of FIG. 5, when the computing device obtains and monitors video data and metadata received from the video camera based on obtained rules.

The process can begin in 600, when the computing device identifies an object within the current FOV of the video camera. For example, the computing device can detect whether there is a change in lighting or color in the video data, changes in position or shape of objects that were previously static in the current FOV of the video camera, etc. Additionally or alternately, for example, the computing device can use feature detection processes such as edge detection, corner detection, blob detection, etc. on the video data to determine whether there is a change in the video data and/or whether the change corresponds to an object.

In some implementations, the computing device may only monitor pixel locations within the FOV that correspond to at least one rule (e.g., rules obtained in 370 of FIG. 3 and/or 540 of FIG. 5). This can allow for faster detection times and/or reduced power consumption. For example, a rule can correspond to real-world coordinates (e.g., latitude and longitude or UTM, as described above), and the computing device can associated pixel locations with real-world coordinates (e.g., as determined in 350 of FIG. 3 and/or 520 of FIG. 5). Accordingly, the computing device may only monitor pixels that are associated with real-world coordinates that correspond to one or more rules.

In other implementations, areas of the FOV that are identified as corresponding to the sky may not be monitored. In further implementations, monitoring video data can be turned off if no pixel locations within the FOV correspond to at least one rule.

In some embodiments, the computing device can additionally determine a type of the identified object. For example, the computing device can use one or more model databases that include a collection of geometric models of objects to be recognized (e.g., humans, different types of vehicles, etc.). Using a model database can be combined with feature detection processes such as, for example, edge matching, interpretation trees, scale-invariant feature transform (SIFT), speeded up robust features (SURF), etc.

In some implementations, the process may only proceed to 610 if a type of the identified object is determined and if the type matches a type of object to be monitored. For example, the computing device can be instructed to only monitor humans or vehicles. Accordingly, the process would only proceed if the type of the identified object is a human or a vehicle. In some embodiments, the type of objects to be monitored can be received from a CIS and/or can be determined based on rules received from the CIS.

In other implementations, the process can proceed to 610 regardless of the type of the identified object and/or the type of the identified object may not be determined.

In 610, the computing device can determine if the identified object broke one or more of the rules. For example, the computing device can determine if the identified object crossed a tripwire from a tripwire rule, entered an area of interest from an area of interest rule, is approaching the video camera or other object based an approach rule, etc. Additionally, for example, the computing device can determine whether the object meets one or more parameters for the appropriate rule. For example, the computing device can determine the speed, size, heading, etc. of the object and determine whether the one or more parameters of the rule are met.

If no rule is broken and/or the parameters for a rule that would be broken are not met (NO in 610), the process can return to 600 when another object is identified within the FOV.

If a rule is broken and any parameters are met (Yes in 610), the process can proceed to 620 where an alert is generated. In some embodiments, an alert can include an identification of the object (e.g., the type of the object), an indication of the rule broken by the object (e.g., the type of rule broken and/or coordinates associated with the rule), an image or video of the object, and/or determined information about the object (e.g., speed, size, heading, estimated time of arrival, etc.).

In some embodiments, the alert can be sent to a user device, such a desktop computer, a laptop, a mobile device, etc. For example, the alert can be send to user device 260 in FIG. 2. In some implementations, the alert can be transmitted over a wired and/or wireless network (e.g., 250 in FIG. 2) and can activate a computer or mobile application. The activation can cause the alert to display the information included in the alert. The activation can also allow a user to save the alert, ignore the alert, and/or receive streamed object information corresponding to the identified object (streamed by the computing device in 630).

In 630, the computing device can stream information about the identified object. In some embodiments, the computing device can send, for example, images or a streamed video of the object and/or regularly updated information about the object (e.g., location, speed, size, heading, etc.). For example, the computing device can stream the information to the user device that received the generated alert in 620.

While the functions or operations depicted in FIG. 6 are shown as being performed in a particular order, the order described is merely an example, and various different sequences of operations can be performed, consistent with certain disclosed embodiments.

Figure 7:
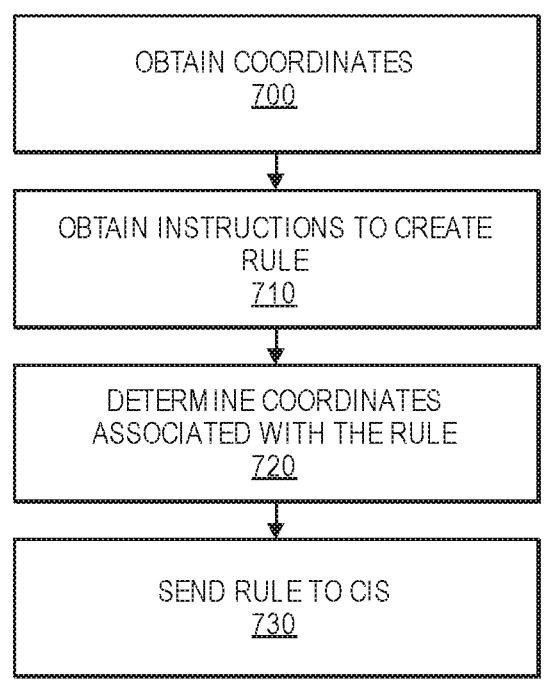
FIG. 7 is a flow diagram illustrating an example of automatically generating a rule, consistent with certain disclosed embodiments.

FIG. 7 is a flow diagram illustrating an example of automatically generating a rule, consistent with certain disclosed embodiments. In various embodiments, the process can be performed using a computerized device or devices. For example, the process can be performed by user device 260 or CIS 240 in FIG. 2. For simplicity of description, the process of FIG. 7 will refer to a computing device (singular). However, in various embodiments, the process described can be performed with multiple computing devices.

The process can begin in 700, when the computing device obtains coordinates associated with a new rule. In some embodiments, obtaining the coordinates can be received in the form of an input file that includes the coordinates of an object. For example, a user may wish to create a new rule for an object having a known location (e.g., a building, an oil pipeline, etc.), and, accordingly, the user can upload a file to an application on the computing device performing the method described in FIG. 7, and the file can include a range of coordinates (e.g., latitude and longitude or UTM coordinates) associated with the object.

In other embodiments, obtaining the coordinates can be received in the form of a name of a map object (e.g., a street name, a river name, etc.). For example, a user may wish to create a new rule for an object on a publicly available digital map, and, accordingly, the user can indicate the map object (e.g., by name or position), and the computing device can determine a range of coordinates (e.g., latitude and longitude or UTM coordinates) associated with the map object based on publicly available digital mapping data.

In some embodiments, the computing device can also receive a keyword associated with the object. For example, a user can enter the keyword or the keyword can be included in the file uploaded to the application.

In 710, the computing device can obtain the instructions to create a rule associated with the coordinates received in 700 (e.g., the coordinates of the object with a known location). In some embodiments, the instructions can be received from the user in a natural language syntax. For example, the instructions can be received as a string that includes the text: "notify on all people or vehicles approaching within 30 meters of the pipeline."

In some implementations, when the rule is received from the user in a natural language syntax, the computing device can parse the string for keywords. For example, the word "notify" can be identified, and the computing device can create a rule that generates an alert when the rule is broken. As a further example, the words "all people or vehicles" can be identified, and the computing device can create a rule that can only be broken when the identified object type is human or vehicle and makes no distinction between types of humans or types of vehicles. As another example, the word "approaching" can be identified, and the computing device can create an approach rule. As an additional example, the words "within 30 meters" can be identified, and the computing device can determine coordinates that correspond to "within 30 meters," as discussed below. As a further example, the word "pipeline" can be identified as a keyword associated with coordinates obtained in 700, and the computing device can, accordingly, use the coordinates obtained in 700 to create the new rule.

In 720, the computing device can determine coordinates associated with the rule. In various embodiments, the coordinates can be determined based on the coordinates received in 700, the type of rule (e.g., tripwire, area of interest, or approach), and other parameters provided by user in 710 (e.g., a distance from the object with a known location or map object). For example, if the type of rule is identified as an approach rule and the user specifies "within 30 meters," the coordinates 30 meters away from the edge coordinates of the object with the known location or map object can be associated with the rule.

In 730, the created rule can be sent to the CIS (e.g., CIS 240 in FIG. 2), and the CIS can store the rules. In embodiments where the CIS performs one or more of 700-720, the CIS can store the rules in 730.

In some embodiments, the CIS or the user device can identify whether any video cameras connected to the CIS or the user device have the ability to monitor an area corresponding to the determined coordinates in 730. For example, each video camera can be associated with its physical location and/or the coordinates of possible FOVs of the video camera. Accordingly, the coordinates of the rule can be used to search the coordinates of the video cameras and/or the coordinates of possible FOVs of the video cameras. In further embodiments, if the rule and/or coordinates associated with the rule are identified as high-priority and the coordinates remain out-of-view of video cameras connected to the CIS or the user device, the CIS or the user device can send the rule and instructions to a video camera that is identified to have a possible FOV that matches the coordinates associated with the rule. The instructions can be for the camera to adjust its FOV to cover the coordinates of the rule.

While the functions or operations depicted in FIG. 7 are shown as being performed in a particular order, the order described is merely an example, and various different sequences of operations can be performed, consistent with certain disclosed embodiments. For example, the computing device can obtain instructions to create a rule in 710, can instruct the user to input the coordinates, and then can obtain the coordinates in 700.

Figure 8:
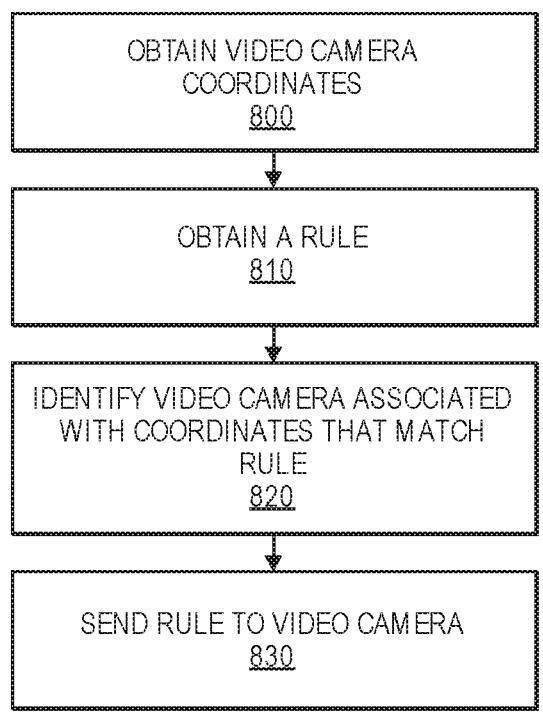
FIG. 8 is a flow diagram illustrating an example of automatically identifying a video camera based on a rule, consistent with certain disclosed embodiments.

FIG. 8 is a flow diagram illustrating an example of automatically identifying a video camera based on a rule, consistent with certain disclosed embodiments. In various embodiments, the process can be performed using a computerized device or devices. For example, the process can be performed by user device 260 or CIS 240 in FIG. 2. For simplicity of description, the process of FIG. 8 will refer to a computing device (singular). However, in various embodiments, the process described can be performed with multiple computing devices.

The process can begin in 800, when the computing device obtains coordinates associated with one or more video cameras (e.g., video camera 120 in FIG. 1. or video cameras 215-235 in FIG. 2). For example, the coordinates can be received from one or more computing devices connected to the one or more video cameras (e.g., computing device 110 in FIG. 1. or computing devices 210-230 in FIG. 2).

In various embodiments, the coordinates can be a physical location of a video camera, coordinates within the current FOV of the video camera, and/or coordinates of possible FOVs of the video camera.

In 810, the computing device can obtain a rule. In some embodiments, the rule can be one of a tripwire rule, an area of interest rule, or an approach rule. In further embodiments, the rule can be obtained based on user input and/or based on receiving the rule from a user device (e.g., user device 260 in FIG. 2).

In various embodiments, a rule can be associated with real-world coordinates, as described above.

In 820, the computing device can compare the coordinates associated with the rule to coordinates associated with the one or more video cameras.

In some embodiments, the coordinates associated with the rule can be compared to the coordinates of the physical locations of the one or more video cameras, and video cameras that are considered within close proximity of the coordinates associated with the rule, if any, can be identified.

In other embodiments, the coordinates associated with the rule can be compared to the coordinates within the current FOVs of the one or more video cameras, and video cameras that have a current FOV that includes the coordinates associated with the rule, if any, can be identified.

In further embodiments, the coordinates associated with the rule can be compared to the coordinates of possible FOVs of the one or more video cameras, and video cameras with possible FOVs that include the coordinates associated with the rule can be identified. For example, if the rule is identified as a "high-priority" rule, if no video cameras have a current FOV that includes the coordinates associated with the rule, and/or if the coordinates associated with the rule have been out-of-view of the one or more video cameras for a threshold amount of time, the video cameras with possible FOVs that include the coordinates associated with the rule, if any, can be identified.

In 830, the computing device can send the rule to computing devices associated with the video cameras that were identified in 820. In some embodiments, the computing device can additionally send instructions to one or more video cameras (e.g., via the computing devices associated with the video cameras) to change their position to a new FOV that covers the coordinates associated with the rule (e.g., if the rule is identified as a "high-priority" rule).

While the functions or operations depicted in FIG. 8 are shown as being performed in a particular order, the order described is merely an example, and various different sequences of operations can be performed, consistent with certain disclosed embodiments. For example, the computing device can obtain the rule in 810, can request coordinates from the one or more video cameras (e.g., coordinates of the video camera, coordinates of the current FOV, possible coordinates of FOVs, etc.), and then can obtain the coordinates in 800.

Figure 9:
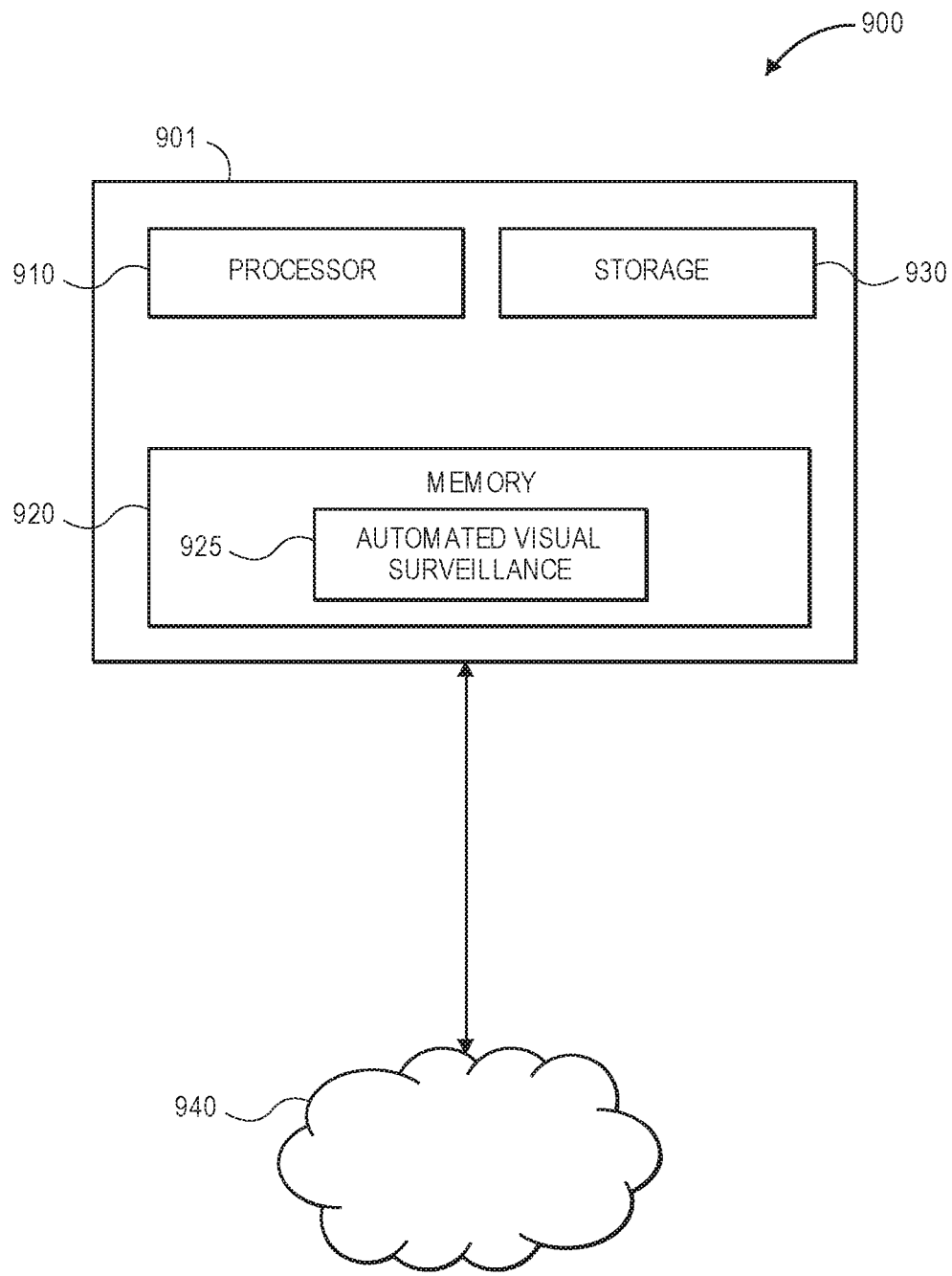
FIG. 9 is a diagram illustrating an example of a hardware system for providing automatic visual surveillance, consistent with certain disclosed embodiments.

FIG. 9 is a diagram illustrating an example of a hardware system 900 for providing automatic visual surveillance, consistent with certain disclosed embodiments. The example system 900 includes example system components that may be used. The components and arrangement, however, may be varied.

A computer 901 may include a processor 910, a memory 920, storage 930, and input/output (I/O) devices (not pictured). The computer 901 may be implemented in various ways and can be configured to perform any of the embodiments described above. For example, the computer 901 may be a general purpose computer, a mainframe computer, any combination of these components, or any other appropriate computing device. The computer 901 may be standalone, or may be part of a subsystem, which may, in turn, be part of a larger system.

In some embodiments, the computer 901 can implement, for example, computing device 110, as shown in FIG. 1, computing devices 210-230, CIS 240, user device 260, as shown in FIG. 2.

The processor 910 may include one or more known processing devices, such as a microprocessor from the Intel Core™ family manufactured by Intel™, the Phenom™ family manufactured by AMD™, or the like. Memory 920 may include one or more non-transitory storage devices configured to store information and/or instructions used by processor 910 to perform certain functions and operations related to the disclosed embodiments, such as the methods of FIGS. 3-8. Storage 930 may include a volatile, non-volatile, non-transitory, magnetic, semiconductor, tape, optical, removable, non-removable, or other type of computer-readable medium used as a storage device. In some embodiments, storage 930 can store rules, videos, images, applications, and the like.

In one embodiment, memory 920 may include one or more programs or subprograms including instructions that may be loaded from storage 930 or elsewhere that, when executed by computer 901, perform various procedures, operations, or processes consistent with disclosed embodiments. For example, memory 920 may include an automated visual surveillance program 925 for providing automated visual surveillance using DEM data (e.g., as described with regard to FIG. 3 or 5), generating rules (e.g., as described with regard to FIG. 4), monitoring video data and/or metadata (as described with regard to FIG. 6), automatically generating rules (e.g., as described with regard to FIG. 7), or automatically identifying a video camera (e.g., as described with regard to FIG. 8), according to various disclosed embodiments. Memory 920 may also include other programs that perform other functions, operations, and processes, such as programs that provide communication support, Internet access, etc. The automated visual surveillance program 925 may be embodied as a single program, or alternatively, may include multiple subprograms that, when executed, operate together to perform the functions and operations of the automated visual surveillance program 925 according to disclosed embodiments.

The computer 901 may communicate over a link with a network 960. For example, the link may be a direct communication link, a local area network (LAN), a wide area network (WAN), or other suitable connection. The network 960 may include the Internet, as well as other networks, which may be connected to various systems and devices, such as network 250 in FIG. 2.

The computer 901 may include one or more input/output (I/O) devices (not pictured) that allow data to be received and/or transmitted by the computer 901. I/O devices may also include one or more digital and/or analog communication I/O devices that allow the computer 901 to communicate with other machines and devices. I/O devices may also include input devices such as a keyboard or a mouse, and may include output devices such as a display or a printer. The computer 901 may receive data from external machines and devices and output data to external machines and devices via I/O devices. The configuration and number of input and/or output devices incorporated in I/O devices may vary as appropriate for various embodiments.

Example uses of the system 900 can be described by way of example with reference to the example embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
    obtaining video camera coordinates associated with one or more video cameras, wherein the video camera coordinates are determined using video data from the one or more video cameras or metadata from the one or more video cameras, and wherein the video camera coordinates associated with a particular video camera represent possible fields of views for the particular video camera;
    searching a plurality of electronically stored surveillance rules for a surveillance rule associated with rule coordinates for a particular fixed geographic area, wherein the rule coordinates are determined based on a digital map that includes the rule coordinates;
    identifying a video camera of the one or more video cameras that is associated with video camera coordinates that include at least part of the rule coordinates; and
    transmitting the surveillance rule to a computing device associated with the video camera.

2. The computer-implemented method of claim 1, wherein the video camera coordinates are determined using one or more digital elevation models.

3. The computer-implemented method of claim 1, wherein the video camera coordinates comprise coordinates in a current field-of-view of a video camera.

4. The computer-implemented method of claim 1, further comprising:
    determining that the surveillance rule is a high-priority rule;
    transmitting instructions to the computing device associated with the video camera, wherein the instructions cause the video camera to adjust a position of the video camera to achieve a field-of-view that corresponds to rule coordinates of the high-priority rule.

5. The computer-implemented method of claim 1, wherein the surveillance rule is at least one of a tripwire rule, an area of interest rule, or an approach rule.

6. The computer-implemented method of claim 1, wherein the rule coordinates are automatically determined based on an input file that comprises coordinates of an object.

7. The computer-implemented method of claim 1, wherein the surveillance rule is generated based on instructions from a user in a natural language syntax.

8. The computer-implemented method of claim 1, wherein the rule coordinates are automatically determined based on an input name of a map object associated with the digital map, wherein the digital map includes coordinates of the map object.

9. The computer-implemented method of claim 1, wherein the computing device monitors a field-of-view of the video camera based on the surveillance rule.

10. The computer-implemented method of claim 9, wherein the computing device monitors a portion of the field-of-view corresponding to the rule coordinates.

11. The computer-implemented method of claim 9, wherein the computing device generates an alert based on an object within the field-of-view of the video camera breaking the surveillance rule.

12. A system, comprising:
    an output device;
    a processor; and
    a memory coupled with the processor, wherein the memory is configured to provide the processor with instructions which when executed cause the processor to:
    obtain video camera coordinates associated with one or more video cameras, wherein the video camera coordinates are determined using video data from the one or more video cameras or metadata from the one or more video cameras, and wherein the video camera coordinates associated with a particular video camera represent possible fields of views for the particular video camera;
    search a plurality of electronically stored surveillance rules for a surveillance rule associated with rule coordinates for a particular fixed geographic area, wherein the rule coordinates are determined based on a digital map that includes the rule coordinates;
    identify a video camera of the one or more video cameras that is associated with video camera coordinates that include at least part of the rule coordinates; and
    cause the output device to transmit the surveillance rule to a computing device associated with the video camera.

13. The system of claim 12, wherein the video camera coordinates are determined using one or more digital elevation models.

14. The system of claim 12, wherein the rule coordinates are automatically determined based on an input file that comprises coordinates of an object.

15. The system of claim 12, wherein the surveillance rule is generated based on instructions from a user in a natural language syntax.

* * * * *